May 10, 1932.    G. F. J. DANDRIDGE ET AL    1,857,530
MEANS FOR THE FASTENING TOGETHER OF PLATES OR SHEETS
Filed Aug. 8, 1929

George Francis John Dandridge
and
George Augustus Mower
Inventors

By Beale & Park
Attorneys

Patented May 10, 1932

1,857,530

UNITED STATES PATENT OFFICE

GEORGE FRANCIS JOHN DANDRIDGE, OF BEDFORD, AND GEORGE AUGUSTUS MOWER, OF LONDON, ENGLAND

MEANS FOR THE FASTENING TOGETHER OF PLATES OR SHEETS

Application filed August 8, 1929, Serial No. 384,401, and in Great Britain October 1, 1928.

This invention relates to means for the fastening together of plates or sheets.

The invention consists broadly of a bolt or rivet formed with a head and having one or more lateral projections at a given distance from said head, adapted to co-operate with overlapping plates having registering holes with suitably shaped enlargements for permitting said bolt and its projections to pass through and be turned. Depressions on the outer surface of one of the plates are preferably provided at an angle to the shaped enlargements, whereby upon the bolt being passed through the registering holes and enlargements in the plates and then rotated, the projections lock with the depressions and the bolt is retained in position.

Reference is now directed to the accompanying drawings wherein:—

Figure 1:
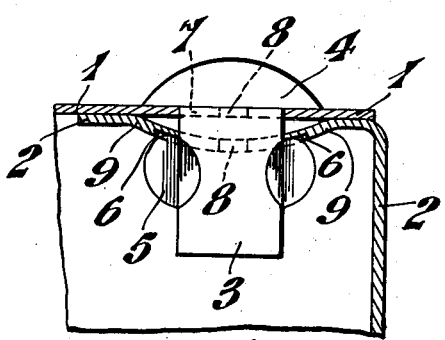
Figure 2:
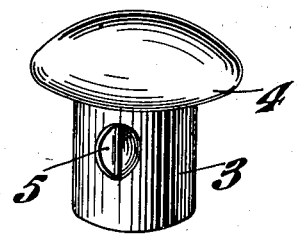
Figure 3:
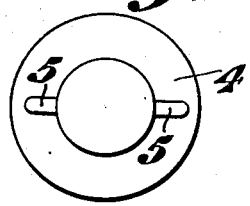
Figure 4:
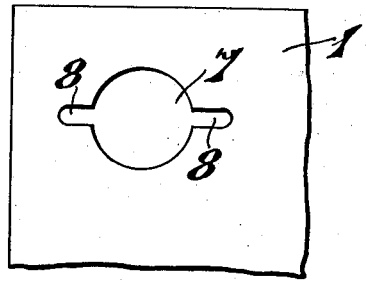
Figure 5:
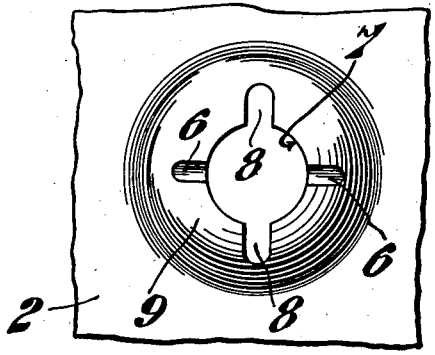
Figure 6:
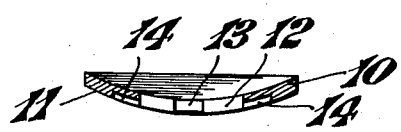

Figure 1 is an enlarged side elevation of a bolt or rivet in position connecting two plates, Figure 2 is an enlarged plan view of a bolt or rivet as viewed from underneath, Figure 3 is a view in perspective of the bolt or rivet, Figure 4 shows the upper plate prepared for the reception of a bolt or rivet, Figure 5 is a plan view of the outer surface of the lower plate and shows the plate prepared to receive a bolt or rivet, and Figure 6 is a plate or washer embodying the principles outlined in the invention.

The plates 1 and 2 are fastened together by a bolt or rivet like devices 3 having a head 4 and two radial and diametrically opposite projections or wings 5 which register with depressions 6 of the plate 2 (see Fig. 1).

The upper plate 1 (see Figure 4) has a hole 7 which has shaped enlargements 8 diametrically opposite to each other. In dotted lines is shown the position to which the bolt or rivet like device 3 is rotated after being passed through the hole 7 and enlargements 8 in the plate 1.

In the lower plate 2 (see Figure 5) is a hole 7 having enlargements 8, the hole and enlargements being of the same dimensions as those of the plate. A disc-like convex excrescence or convexity 9 is pressed out of the plane of the plate 2, the centre point of the convexity 9 and of the hole 7 being the same. In the convexity 9 are formed the depressions 6, at an angle to the enlargements 8, and diametrically opposite to one another.

In Figure 6 the plate or washer 10 has an excrescence or convexity 11 through which is bored a hole 12 having shaped enlargements 13, and in the convexity 11 are formed depressions 14.

The plates 1 and 2, of resilient material, are placed together so that the holes 7 and the enlargements 8 in the plates register, and the convexity 9 of the plate 2 is to the outside. The bolt or rivet like device 3 and its projections or wings 5 is then passed through the holes 7 and enlargements 8, until the lower face of the bolt head 4 abuts against the plate 1, and the wings 5 now extend beyond the outer surface of the plate 2. The bolt 3 is then revolved until the wings 5 are in alignment with the depression 6 in the convexity 9, into which they snap and lock the head of the bolt 3 firmly in position against the plate 1, the resilient material of which the plates 1 and 2 are made and the extra resiliency imparted by the convexity 9 causing the plate 2 to press against the wings 5 with a springlike action.

The force exerted by the plate 2 upon the wings 5, depends upon the length of the bolt 3 from the underside of the head 4 to the bearing surface of the wings 5, and the extent to which the convexity 9 has been raised above the plane formed by the surface of the plate 2.

When the plates or sheets to be joined together are not resilient (for instance of wood) the washer 10 of resilient material is used (see Figure 6). The plates to be joined together are provided with holes and enlargements such as are formed in plates 1 and the washer 10 is placed against one of the plates with its convexity 11 and depressions 14 towards the outside, and its hole 12 and enlargements 13 registering with those of the plates to be fastened together. The procedure of inserting and adjusting the bolt is then set forth in the preceding description, the resiliency lacking in the plates or sheets being made good by the resiliency of the washer 10.

Instead of having an excrescence or convexity formed thereon, the washer 10 may be wholly convex.

Plates or sheets, one or more of a non-resilient material, and one or more of a resilient material can be fastened together by providing on one of the resilient plates or sheets the arrangement as shown provided for plate 2 in the drawings (see Figure 5).

The bolt 3 may be provided with a saw-cut to take a screw-driver, and the wings 5 may or may not be integral with the bolt 3.

Were the bolt to be employed merely in cooperation with holes and enlargements in the plates to be held together, the bolt would tend to rotate and work loose if subjected to vibrations, and the wings might work back into the enlargements, and the plates would then come apart, which possibility is obviated in the present invention by the bolt being locked and resiliently held in position.

Although in the drawings only two plates are shown fastened together, and by only one bolt it will of course be understood that any number of plates may be attached together by the same bolts and many bolts used without departing from the spirit of the invention.

Although in the present instance two wings on the bolts are shown co-operating with two depressions, it may be found convenient to provide one or a plurality of wings co-operating with depressions.

What we claim and desire to secure by Letters Patent is:—

Means for fastening plates together comprising a removable rivet like device formed with a head and having diametrically opposed lateral projections punched out of its shank at a given distance from said head, adapted to co-operate with over-lapping plates having registering holes for giving access to said rivet like device and its projections, and depressions on the outer surface of a convexity pressed out of the inner one of the plates at an angle to the shaped enlargements whereby upon the bolt being passed through the registering holes and enlargements in the plates and then rotated, the projections lock with the depressions and the bolt is retained in position to clamp the plates together by the resilience produced by the convexity of the plate.

In witness whereof we affix our signatures.

GEORGE FRANCIS JOHN DANDRIDGE.
GEORGE AUGUSTUS MOWER.